US011252688B2

(12) United States Patent
Tiirola et al.

(10) Patent No.: US 11,252,688 B2
(45) Date of Patent: Feb. 15, 2022

(54) BEAM-SPECIFIC AND NON-BEAM-SPECIFIC SYNCHRONIZATION SIGNAL BLOCK POSITIONS FOR WIRELESS NETWORKS

(71) Applicant: NOKIA TECHNOLOGIES OY, Espoo (FI)

(72) Inventors: Esa Tiirola, Kempele (FI); Kari Hooli, Oulu (FI); Sami-Jukka Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/650,012

(22) PCT Filed: Sep. 18, 2018

(86) PCT No.: PCT/FI2018/050675
§ 371 (c)(1),
(2) Date: Mar. 24, 2020

(87) PCT Pub. No.: WO2019/068957
PCT Pub. Date: Apr. 11, 2019

(65) Prior Publication Data
US 2020/0280945 A1    Sep. 3, 2020

Related U.S. Application Data

(60) Provisional application No. 62/566,758, filed on Oct. 2, 2017.

(51) Int. Cl.
*H04W 56/00* (2009.01)
*H04B 7/06* (2006.01)
(Continued)

(52) U.S. Cl.
CPC ...... *H04W 56/0015* (2013.01); *H04B 7/0617* (2013.01); *H04W 74/0808* (2013.01); *H04W 48/12* (2013.01); *H04W 48/16* (2013.01)

(58) Field of Classification Search
CPC ......... H04W 56/0015; H04W 74/0808; H04W 48/12; H04W 48/16; H04W 56/00; H04W 74/08; H04B 7/0617; H04B 7/06
(Continued)

(56) References Cited

U.S. PATENT DOCUMENTS

| 2015/0117375 A1* | 4/2015 | Sartori ............... H04W 56/002 370/329 |
| 2017/0231011 A1 | 8/2017 | Park et al. |

(Continued)

FOREIGN PATENT DOCUMENTS

| WO | WO 2011/042045 A1 | 4/2011 |
| WO | WO 2015/080645 A1 | 6/2015 |

(Continued)

OTHER PUBLICATIONS

International Search Report and Written Opinion dated Dec. 5, 2018 corresponding to International Patent Application No. PCT/FI2018/050675.

(Continued)

*Primary Examiner* — Danh C Le
(74) *Attorney, Agent, or Firm* — Squire Patton Boggs (US) LLP

(57) ABSTRACT

A technique may include determining, by a base station in a wireless network, that the base station was unable to transmit a synchronization signal block for a beam via a beam-specific synchronization signal block position that is associated with the beam; transmitting, by the base station in response to the determining, a synchronization signal block for the beam via a non-beam-specific synchronization signal block position; and transmitting, by the base station, control information indicating the transmitting of the synchronization signal block via the non-beam-specific synchronization signal block position.

21 Claims, 8 Drawing Sheets

(51) Int. Cl.
*H04W 74/08* (2009.01)
*H04W 48/16* (2009.01)
*H04W 48/12* (2009.01)

(58) Field of Classification Search
USPC .................... 370/350, 310.2; 455/562.1, 418
See application file for complete search history.

(56) References Cited

U.S. PATENT DOCUMENTS

| | | | |
|---|---|---|---|
| 2018/0302889 A1* | 10/2018 | Guo ........................ | H04B 7/088 |
| 2019/0045559 A1* | 2/2019 | Huang ................ | H04W 72/046 |
| 2019/0052337 A1* | 2/2019 | Kwon ................ | H04W 72/085 |
| 2019/0058538 A1* | 2/2019 | Sun ................... | H04W 74/0891 |
| 2020/0045662 A1* | 2/2020 | Liu ....................... | H04W 56/00 |
| 2020/0059397 A1* | 2/2020 | da Silva ............... | H04B 7/0617 |
| 2020/0169310 A1* | 5/2020 | Kwon ............... | H04W 74/0891 |
| 2020/0252182 A1* | 8/2020 | Choi .................... | H04W 72/04 |
| 2020/0288503 A1* | 9/2020 | Sahlin .................. | H04W 72/04 |
| 2021/0120506 A1* | 4/2021 | Takeda ................. | H04W 48/16 |

FOREIGN PATENT DOCUMENTS

| | | |
|---|---|---|
| WO | WO 2016/210302 A1 | 12/2016 |
| WO | WO 2017/026434 A1 | 2/2017 |
| WO | WO 2018/204703 A1 | 11/2018 |

OTHER PUBLICATIONS

Extended European Search Report dated Aug. 23, 2021 corresponding to European Patent Application No. 18865111.1.
LG Electronics: "Remaining details on L3 measurement and mobility management," 3GPP Draft; R1-1715847, 3GPP TSG RAN WG1 Meeting NR#3, Nagoya, Japan, Sep. 17, 2017, XP051339307.
Notification of Reasons for Rejection (non-final) dated May 31, 2021 corresponding to Japanese Patent Application No. 2020-519140, with English summary thereof.
Panasonic, "DRS design for LAA," 3GPP, R1-151679, 3GPP TSG RAN WG1#80bis, Belgrade, Serbia, Apr. 10, 2015, pp. 1-6.

* cited by examiner

US 11,252,688 B2

BEAM-SPECIFIC AND NON-BEAM-SPECIFIC SYNCHRONIZATION SIGNAL BLOCK POSITIONS FOR WIRELESS NETWORKS

RELATED APPLICATION

This application was originally filed as PCT Application No. PCT/FI2018/050675, filed on Sep. 18, 2018, which claims priority from U.S. Provisional Application No. 62/566,758, filed on Oct. 2, 2017. The contents of these prior applications are hereby incorporated by reference.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes determining, by a base station in a wireless network, that the base station was unable to transmit a synchronization signal block for a beam via a beam-specific synchronization signal block position that is associated with the beam; transmitting, by the base station in response to the determining, a synchronization signal block for the beam via a non-beam-specific synchronization signal block position; and transmitting, by the base station, control information indicating the transmitting of the synchronization signal block via the non-beam-specific synchronization signal block position.

According to an example implementation, an apparatus includes at least one processor and at least one memory including computer instructions, when executed by the at least one processor, cause the apparatus to: determine, by a base station in a wireless network, that the base station was unable to transmit a synchronization signal block for a beam via a beam-specific synchronization signal block position that is associated with the beam; transmit, by the base station in response to the determining, a synchronization signal block for the beam via a non-beam-specific synchronization signal block position; and transmit, by the base station, control information indicating the transmitting of the synchronization signal block via the non-beam-specific synchronization signal block position.

According to an example implementation, a computer program product includes a computer-readable storage medium and storing executable code that, when executed by at least one data processing apparatus, is configured to cause the at least one data processing apparatus to perform a method including: determining, by a base station in a wireless network, that the base station was unable to transmit a synchronization signal block for a beam via a beam-specific synchronization signal block position that is associated with the beam; transmitting, by the base station in response to the determining, a synchronization signal block for the beam via a non-beam-specific synchronization signal block position; and transmitting, by the base station, control information indicating the transmitting of the synchronization signal block via the non-beam-specific synchronization signal block position.

According to an example implementation, a method includes receiving, by a user device, a synchronization signal block; determining, by the user device, whether the synchronization signal block was received via either a beam-specific synchronization signal block position that is associated with the beam, or a non-beam-specific synchronization signal block position; and performing a first operation only if the synchronization signal block was received via a beam-specific synchronization signal block position.

According to an example implementation, an apparatus includes at least one processor and at least one memory including computer instructions, when executed by the at least one processor, cause the apparatus to: receive, by a user device, a synchronization signal block; determine, by the user device, whether the synchronization signal block was received via either a beam-specific synchronization signal block position that is associated with the beam, or a non-beam-specific synchronization signal block position; and perform a first operation only if the synchronization signal block was received via a beam-specific synchronization signal block position.

According to an example implementation, a computer program product includes a computer-readable storage medium and storing executable code that, when executed by at least one data processing apparatus, is configured to cause the at least one data processing apparatus to perform a method including: receiving, by a user device, a synchronization signal block; determining, by the user device, whether the synchronization signal block was received via either a beam-specific synchronization signal block position that is associated with the beam, or a non-beam-specific synchronization signal block position; and performing a first operation only if the synchronization signal block was received via a beam-specific synchronization signal block position.

According to an example implementation, a method includes determining, by a user device in a wireless network, that the user device is unable to receive a synchronization signal block for a beam via a beam-specific synchronization signal block position that is associated with the beam; receiving, by the user device a synchronization signal block for the beam via a non-beam-specific synchronization signal block position out of a plurality of non-beam-specific synchronization signal block positions; and receiving, by the user device, control information indicating that the synchronization signal block is transmitted via the non-beam-specific synchronization signal block position.

According to an example implementation, an apparatus includes at least one processor and at least one memory including computer instructions, when executed by the at least one processor, cause the apparatus to: determine, by a user device in a wireless network, that the user device is unable to receive a synchronization signal block for a beam via a beam-specific synchronization signal block position that is associated with the beam; receive, by the user device a synchronization signal block for the beam via a non-beam-specific synchronization signal block position out of a plurality of non-beam-specific synchronization signal block positions; and receive, by the user device, control information indicating that the synchronization signal block is transmitted via the non-beam-specific synchronization signal block position.

According to an example implementation, a computer program product includes a computer-readable storage medium and storing executable code that, when executed by at least one data processing apparatus, is configured to cause the at least one data processing apparatus to perform a method including: determining, by a user device in a wireless network, that the user device is unable to receive a synchronization signal block for a beam via a beam-specific synchronization signal block position that is associated with the beam; receiving, by the user device a synchronization signal block for the beam via a non-beam-specific synchronization signal block position out of a plurality of non-beam-specific synchronization signal block positions; and receiving, by the user device, control information indicating that the synchronization signal block is transmitted via the non-beam-specific synchronization signal block position.

The details of one or more examples of implementations are set forth in the accompanying drawings and the description below. Other features will be apparent from the description and drawings, and from the claims.

DETAILED DESCRIPTION

Figure 1:
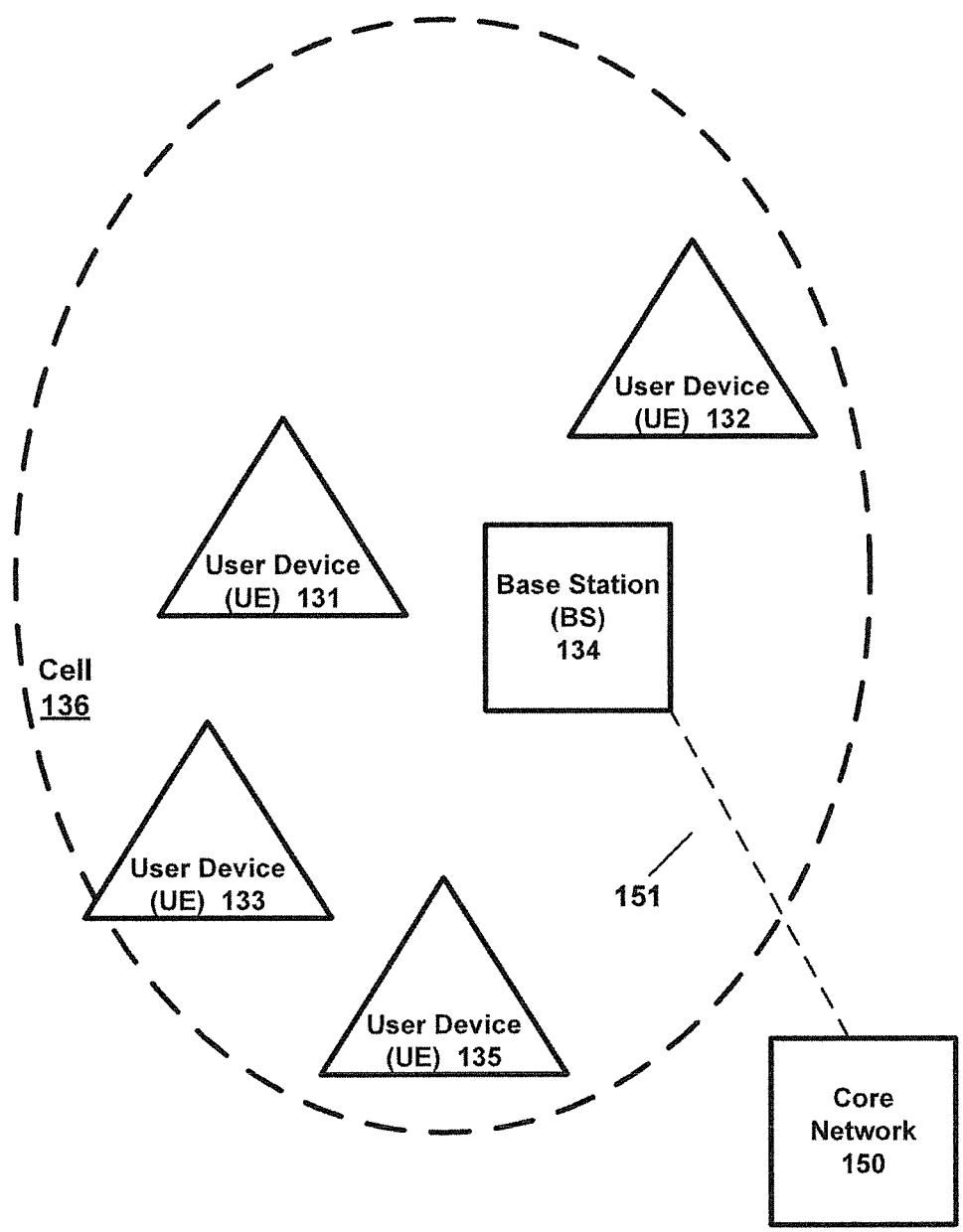
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e) Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation. In some cases, unlicensed band operation may be based on licensed assisted unlicensed access, e.g., by means of carrier aggregation or dual connectivity. Another option is to operate in stand-alone mode in unlicensed band.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

According to an example implementation, a BS (e.g., a 5G BS, which may be referred to as a gNB, or other BS) may transmit a synchronization signal block (SS block), which may be received by one or more UEs/user devices. In an example implementation, a SS block may include, e.g., one or more or even all of: primary synchronization signals (PSS), secondary synchronization signals (SSS), a physical broadcast control channel (PBCH), and demodulation reference signals (DMRS). By way of illustrative example, the PSS and SSS may allow a UE to obtain initial system acquisition, e.g., which may include obtaining initial time synchronization (e.g., including symbol and frame timing), initial frequency synchronization, and cell acquisition (e.g., including obtaining the physical cell ID for the cell). Also, a UE may use DMRS and PBCH to determine slot and frame timing. In addition, the PBCH may provide one or more important parameters (e.g., system frame number, information on how to receive remaining system information/RMSI) for a UE to access cell, and may also include slot and frame timing. The DMRS may allow the UE to demodulate the PBCH coherently, and may also convey slot timing information. These are some illustrative examples of how various control information within a synchronization signal block (SS block) may be used by a UE. PBCH may contain also information on the frequency/time location of the DL control channel resources used to schedule RMSI (remaining minimum system information) (RMSI CORESET). RMSI CORESET associated to each beam-specific SS block may be used in the standalone operation.

Figure 2:
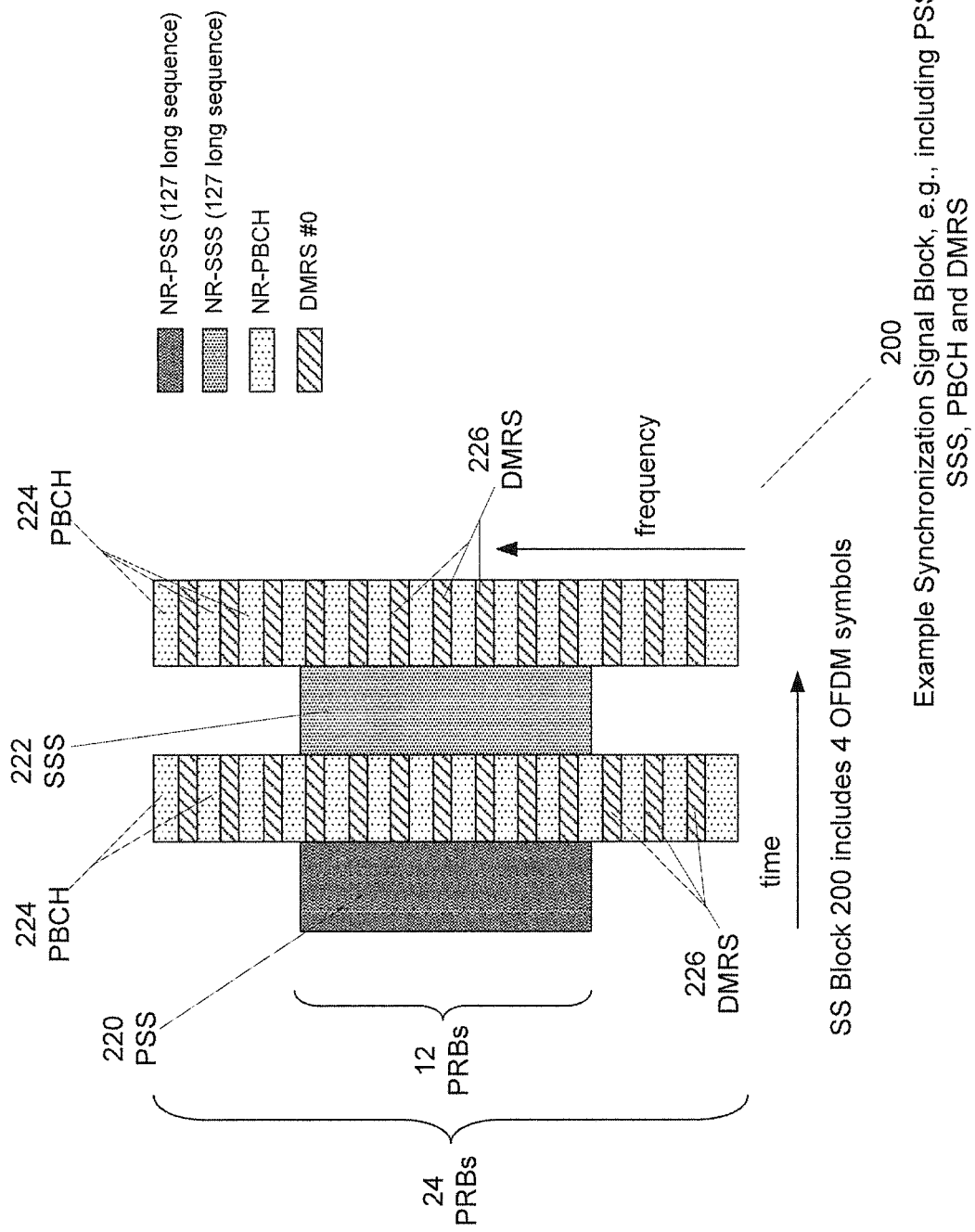
FIG. 2 is a diagram illustrating a synchronization signal block (SS block) according to an illustrative example implementation.

FIG. 2 is a diagram illustrating a synchronization signal block (SS block) according to an illustrative example implementation. The SS block 200 may include information provided across 4 symbols and 12-24 resource blocks (RBs, also known as physical resource blocks or PRBs). For example, as shown in the SSB 200 of FIG. 2, primary synchronization signals (PSS) 220 is provided via 12 PRBs and one OFDM (orthogonal frequency division multiplexing) symbol (shown as the first OFDM symbol). Secondary synchronization signals (SSS) 222 are provided via 12 PRBs and the third OFDM symbol. The physical broadcast control channel (PBCH) 224 and demodulation reference signals (DMRS) 226 are interleaved within both the second and fourth OFDM symbols of the SSB 200 and provided across 24 PRBs, as shown in FIG. 2. For example, the DMRS/PBCH mapping shown in FIG. 2 may be an illustrative example implementation, and may illustrate the principle of frequency division multiplexing (FDM), e.g., for example, where the DMRS location & density may not necessarily reflect the actual mapping in the subcarrier level. Each resource block (RB), which may also be referred to as a physical resource block (PRB), may include a plurality of subcarriers, such as 12 subcarriers, for example, or other number of subcarriers.

Also, according to an example implementation, one or more SS blocks may be transmitted by a BS in fixed time domain locations, such as within a specific time (e.g., 5 ms) window, where this group of SS blocks within this time window may be referred to as a SS block burst set.

According to an example implementation, such as for New Radio (NR)/5G, the SS block may be allocated in a flexible manner within NR carrier in terms of time and frequency domain allocation. In time domain, the SS block (or burst set) can be transmitted with one of 5, 10, 20, 40, 80 or 160 ms periodicity. In frequency domain, a location of a SS block in frequency is flexible (e.g., carrier frequency for SS block may vary or be flexible).

In an illustrative example implementation, unlicensed spectrum operation may follow certain rules. One is that the transmitter may need to perform listen before talk (LBT) channel assessment, where the transmitter may first sense the wireless medium (or wireless channel) and may only transmit if it determines that the medium is not busy (not occupied). Also, for example, in at least some cases, a transmitter may typically also occupy the wireless medium only for a limited time before giving a transmission opportunity for other transmitters. These have certain implications on the system operation. While in licensed spectrum the gNB/BS may transmit SS blocks always on the predefined time domain positions, in unlicensed spectrum there is uncertainty whether certain SS blocks can be transmitted or not. In licensed spectrum the UE can always assume that certain SS block positions (informed to UE) are transmitted but in unlicensed spectrum because of listen-before-talk (LBT) requirement the UE cannot make the same assumption. For example, in unlicensed spectrum, based on LBT, if the channel is busy during a specific time period, this may prevent a BS from transmitting a SS block for one or more beams, which may inhibit a UE from performing time and frequency synchronization and tracking for example (e.g., if the UE is unable to receive a SS block for one or more beams).

NR UE operating in unlicensed spectrum will need downlink signaling to facilitate UE's time and frequency synchronization acquisition and tracking. This is especially challenging when gNB/BS operates using multi-beam approach for DL common control signaling, i.e. where gNB is to transmit downlink synch signals and PBCH, for instance, in beam sweeping manner and due to LBT some of the beams may be blocked and thus, e.g. the synch signals cannot be transmitted throughout the sector. For example, SS blocks may be transmitted in a beam sweeping fashion across multiple beams, with the BS transmitting a SS block for each beam (e.g., for each of beams 0-47, in the case of 48 beams) for each beam of a set beams. The BS may apply a different transmit beam, for example, to transmit the SS block, as the BS sweeps across the set of beams. For a multi-antenna system, for example, a different set of beam weights may be applied to a set of antennas at the transmitter to generate different beams. In this manner, a BS may be able to transmit signals, such as a SS block, that may UEs that may be located in different locations or positions within a cell, via different beams. Also, e.g., depending on the BS/gNB hardware capability, the BS/gNB may be able to transmit multiple beams in parallel (during same time resource/time domain position) using each of 48 time domain positions. For example, a BS may be able to transmit, e.g., a signal (such as a SS block) via 4 different beams in parallel (during same time domain resource), for example. This will increase the number of beams supported for common control signaling (with given number of time domain sweeping resources).

In an example implementation, at least in some cases, because of a LBT requirement, the BS may be unable to transmit a SS block for one or more beams, which may cause problems for a UE that is measuring beams and/or attempting to maintain time and frequency synchronization with a BS. For example, BS may perform LBT assessment separately for each SS block or a sub-set of SS blocks. This may result in that the BS is able to transmit a SS block for one or more beams while BS is unable to transmit another SS block for another one or more beams.

Therefore, according to an example implementation, a set of beam-specific SS block positions may be provided, e.g., with one beam-specific SS block position being provided for (or associated with) each beam. Each of the beam-specific SS block positions may be associated with or assigned to one of the beams, e.g., either permanently or semi-statically, where a semi-static assignment or association may, for example, continue for a predetermined period of time, or until a subsequent assignment may override the assignment or association, for example. In addition, to a set of beam-specific SS block positions, a set of non-beam-specific SS block positions may be provided, where a BS may send a SS block for a beam via a non-beam-specific SS block position if the BS was unable to transmit the SS block for that beam via the beam-specific SS block position associated with or assigned to that beam.

Figure 3:
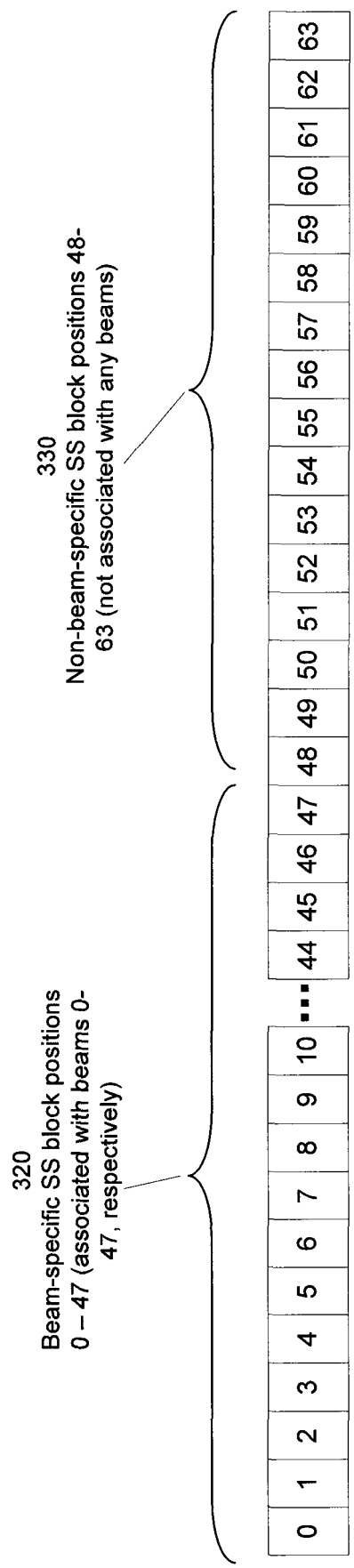
FIG. 3 is a diagram illustrating a set of beam-specific SS (synchronization signal) block positions and a set of non-beam-specific SS block positions.

FIG. 3 is a diagram illustrating a set of beam-specific SS block positions and a set of non-beam-specific SS block positions. In the example shown in FIG. 3, a set 320 of 48 beam-specific SS block positions are shown, e.g., one block position associate with or assigned to each of 48 beams (numbered as SS block positions 0-47). Also, a set 33 of 16 non-beam-specific SS block positions are shown (numbered as SS block positions 48-63). However, the non-beam-specific SS block positions are not associated with or assigned to any beam. Rather, for example, a BS may transmit a SS block for a beam (e.g., by applying a specific transmit beam) that the BS was unable to transmit due to LBT. For example, if LBT prevents a BS from transmitting a SS block for beam 7 that would have been transmitted via beam-specific SS block position 7, then the BS may then (attempt to) transmit the SS block for that beam (beam 7) via one of the non-beam-specific SS blocks (e.g., via SS block position 49, for example). Thus, in this case, the BS may apply beam 7 (by a applying a set of antenna weights to generate transmit beam 7) to transmit the SS block during SS block position 49, according to this illustrative example.

Thus, in this manner, the set 320 of beam-specific SS block positions may be considered as a primary set of SS block positions (e.g., SS block positions 0-47, in FIG. 3) that are assigned to specific beams and may typically be used by a BS to transmit each SS block via the assigned or associated beam. On the other hand, the set 330 of non-beam-specific SS block positions may be considered as a secondary (or alternate or backup) set of SS block positions, e.g., which may be used by the BS to transmit a SS block for a beam that the BS was unable to transmit via the beam-specific SS block position assigned to the beam.

Thus, for example, a BS may, after performing LBT, may attempt to transmit a SS block in each of the beam-specific SS block positions for (or via) the associated beam (e.g., by applying the indicated transmit beam to its antennas, to transmit the SS block during the associated beam-specific SS block position). For any SS blocks that the BS were unable to transmit, e.g., due to a detected busy channel during LBT, the BS may then perform a LBT and then transmit the SS block for the beam (by applying the transmit beam) via one of the non-beam-specific SS block positions.

According to an example implementation, when a SS block is transmitted via a beam-specific SS block position, the beam for such SS block is known. As a result, the UE may use a SS block received via a beam-specific SS block position to perform the following, by way of illustrative example: 1) perform initial system acquisition for a cell or BS, including time-frequency synchronization and tracking based on PSS/SSS signals, for example; 2) cell identification (e.g., determining a physical cell identifier/PCI for a transmitting cell) based on the received PSS/SSS signals; 3) determine a random access resource (e.g., random access preamble or code) associated with the beam, that may be used to send a random access request to the BS (e.g., each SS-block position may have a corresponding Random Access channel/PRACH position); and, 4) beam measurement (e.g., including measurement of reference signal received power (RSRP) of the PSS/SSS signals of a received SS block), which may be used by the UE to determine one or more best beams of the UE, and which a set of best beams may be reported to the BS. For example, each SS block position may have corresponding RACH (random access channel) resources where a resource may include, e.g., a set of RACH (random access) preambles. Because a beam is known or associated with (assigned) to each beam-specific SS block position, a UE may perform all operations 1)-4) based on a SS block received via a beam-specific SS block (because the UE knows the beam associated with or assigned to such received SS block or that a certain beam is used to transmit SS block in the beam-specific SS block position in question).

On the other hand, according to an example implementation, a UE does not necessarily know the beam associated with or assigned to a SS block that is received via one of the non-beam-specific SS block positions. As a result, the UE may not be able to perform the following operations based on a SS block received via a non-beam-specific SS block position (because the UE will not know the beam associated with such received SS block): 3) determine a random access resource associated with the beam; and, 4) beam measurement (e.g., the RSRP of the received PSS/SSS signals may be measured, but the UE may not know for which beam these signals are for or associated with). However, the UE will still be able to perform the following operations based on a SS block received via a non-beam-specific SS block position: 1) perform initial system acquisition for a cell or BS, including time-frequency synchronization and tracking based on PSS/SSS signals; and, 2) cell identification (e.g., determining a physical cell identifier/PCI for a transmitting cell) based on the received PSS/SSS signals. The PSS/SSS signals are still received an may be used for time-frequency synchronization, and may also be used by the UE to derive or determine the cell identification (e.g., PCI) for the cell that transmitted the SS block.

Therefore, according to an example implementation, there may be two types of SS blocks that may be transmitted (or two types of SS block positions), including 1) SS blocks transmitted via a beam-specific SS block position in which the UE knows the beam such SS block is associated with; and 2) SS blocks transmitted via a non-beam-specific SS block position in which the UE may not typically know the beam associated with such SS blocks. As noted above, the operations that may be performed by the UE based on the SS block are different for the two types of SS blocks (or for SS blocks received on the two types of SS block positions). For example, while the non-beam-specific SS block position may provide a secondary or alternate resource for the UE to transmit a SS block for a beam that may have previously failed, a SS block transmitted via a non-beam-specific SS block position may have a more limited (more restricted) use for a UE, e.g., the SS block (and PSS/SSS) received via a non-beam-specific SS block position may be used (e.g., primarily for or only for) for cell-specific operations, such as time-frequency synchronization and cell identification, but not typically used for beam-specific operations or determinations (e.g., because the beam may not typically be known by UE for non-beam-specific SS block positions). Therefore, according to an example implementation, it may be useful for the UE to know (or be able to determine) whether a received SS block is transmitted via a beam-specific SS block position, or via a non-beam-specific SS block position.

According to an example implementation, a BS may transmit control information (e.g., included within a SS block) that may indicate whether the SS block is provided via either a beam-specific SS block position, or via a non-beam-specific SS block position, so that, for example, the UE may then know which operations the UE may (and may not) perform based on the received SS block.

Therefore, according to an example implementation, a BS may transmit control information (e.g., within a SS block, or separately such as within a radio resource contro/RRC message) to the UE indicating a transmission of a SS block on one or more non-beam-specific SS block positions. For example, one or more bits, or a bit map (or other control information), may be provided or transmitted by the BS to one or more UEs, indicating whether each of a plurality of SS block positions are either beam-specific SS block positions or non-beam-specific SS block positions. Thus, in such a case, there may be a pool of SS block positions, and the control information may indicate, for each of a plurality of SS block positions, whether the SS block position is a beam-specific or non-beam specific SS block position. Or, alternatively, one or more bits, or other control information, may be transmitted by a BS to one or more UEs indicating that a SS block is transmitted on a non-beam-specific SS block position(s). That way, the UE may know (or be able) to receive a SS block via the indicated non-beam-specific SS block position.

In one example implementation, the SS block positions are divided into beam-specific positions (e.g., fixed or primary SS block positions) and non-beam-specific (e.g., secondary, or alternate, or opportunistic) block positions, as shown in FIG. 3. The logical SS block positions 48-63 represent non-beam-specific SS block positions, in this illustrative example. The BS/gNB may attempt to transmit a SS block or SS burst set within the beam-specific block positions, e.g., for each of the 48 beams, as the BS performs beam sweeping (sweeps through the different beams). The BS may use the non-beam-specific (e.g., secondary or opportunistic) SS block positions for transmitting SS block(s) that the BS was unable transmit in the certain beam-specific SS block position because a LBT channel assessment indicated a busy or occupied channel. In other words, when a certain SS block needs to be dropped (cannot be transmitted) due to the LBT channel assessment indicates a busy or occupied channel, the BS/gNB can use the time-frequency resources of one (or more) of the non-beam-specific SS block positions for sending/transmitting the SS block using the failed beam (the beam for which the SS block was not transmitted due to LBT). Thus, the BS may transmit a SS block, by applying the (failed) beam, via one of the non-beam-specific SS block positions.

When UE does not detect a SS block in a beam-specific SS block position, the UE may assume the SS block transmission failed, and the UE may monitor the non-beam-specific (secondary or opportunistic) SS block position resources for additional SS block transmission(s). As noted, in an example implementation, these non-beam-specific SS block positions may, at least in some cases, only facilitate cell-specific determinations (e.g., time-frequency synchronization and cell identification), but not beam-specific determinations (because the beam for such SS block is not necessarily known by the UE), such as random access/PRACH resource determination or association and beam measurement (and/or other beam-specific information).

In an illustrative example implementation, current SS block positions (up-to 64) may be used solely as beam-specific (or primary or fixed) SS block positions. Following this embodiment, non-beam-specific SS block positions are use as additional time-frequency resources (on top of 64 beam-specific SS block positions) located after the last beam-specific (or primary or fixed) block position. As noted, there may be a limited functionality of SS blocks received via one of the non-beam-specific (secondary or opportunistic or alternative) SS block positions.

For example, in some cases (such as for beam-specific SS block positions), there may be an association between a random access (RA) resource and a beam (or a beam-specific SS block position), e.g., for beam-formed SS block transmission where UE measures SS blocks, and selects a best or strongest beam, and the selects the corresponding RA resource, and then the UE would transmit a RA preamble on the RA resource associated with the strongest beam to indicate a selection of that strongest beam. However, according to an example implementation, there is no association between a random access (RA) resource and a non-beam-specific SS block position. Thus, in an example implementation, a SS block received via a non-beam specific SS block position may not typically be used to determine a corresponding RA resource, for example.

A SS block transmitted via a beam-specific SS block position may also be used for beam measurements (e.g., RSRP based beam measurement of PSS/SSS signals for a beam), but may not be done using non-beam-specific SS block positions. In one illustrative example, there may be fewer non-beam-specific SS block positions than beam-specific SS block positions. Thus, there may not be 1-to-1 mapping of non-beam-specific SS block positions to beams. As a result, there may not be a non-beam-specific SS block position for each beam. In the case of receiving a SS block via a non-beam-specific SS block, a UE can measure a PSS/SSS for the beam, but the UE may not know for which beam this is measurement is for, for example.

SS blocks transmitted via either a beam-specific and non-beam-specific SS block positions may be used for: time-frequency synchronization, and cell identification (e.g., cell ID: there is a physical cell ID encoded as part of PSS and SSS that together convey physical cell ID). These may be considered as cell-specific functions or operations (not beam-specific) and as a result, these functions can be performed by UE for both beam-specific (fixed or primary) SS block positions and non-beam-specific (e.g., secondary, alternative or opportunistic) SS block positions.

The non-beam-specific SS block positions can be indicated to the UE, e.g., using dedicated higher layer signaling. For example, a UE may be connected to a network/BS via a serving cell, and is seeking information about SS blocks for another cell. A BS may provide RRC (radio resource control) message to UE and instruct the UE to connect (as part of dual connectivity) to this other cell, and the BS may provide a bit map to indicate which SS blocks (block positions) transmitted by the other cell are beam-specific and which SS blocks (block positions) are non-beam-specific for this other cell. Or, BS may use common (broadcast) higher layer signaling (such as PBCH and/or RMSI—remaining minimum system information), that is broadcast in PDCCH (physical downlink control channel) and/or via PDSCH (physical downlink shared channel).

In one embodiment, there is additional signaling element (or control information) that may be provided within a SS block to indicate to the UE whether the detected SS block is provided in a beam-specific or in a non-beam-specific SS block position. In the former case, the UE can determine the SS block beam index from the timing information provided by the SS block (PBCH DMRS carried part of the SS block index and PBCH payload the rest of the SS block index). In the latter case, the UE determines that the SS block is opportunistically transmitted (e.g., in case of a failed earlier transmission of SS block for this beam) via a non-beam specific SS block position and use the SS block only for cell-related operations, such as cell identification, time and frequency synchronization.

The signaling (or control information) providing a beam-specific/non-beam-specific indication for a SS block can be, e.g., provided as one or more of the following, by way of illustrative example:

1) One or more bits (e.g., such as a bit map) indicating whether each of a plurality of synchronization signal block positions are a beam-specific synchronization signal block position or an non-beam-specific synchronization signal block position. These bits or bit may be provided, e.g., via or included within a RMSI (remaining minimum system information), or may be provided via radio resource control (RRC) message or signaling (e.g., such as in case of unlicensed spectrum).

2) Demodulation reference signal (DMRS) elements, which are part of a transmitted synchronization signal block, are multiplied by a code indicating whether the transmitted synchronization signal block is provided via either a beam-specific synchronization signal block position or a non-beam-specific synchronization signal block position. For example, the code may include either a first code [1 1] or a second code [1 −1], where different codes may be used to distinguish between beam-specific and non-beam-specific SS block positions.

3) PBCH DMRS sequence is initialized by additional one-bit information to indicate whether beam-specific or non-beam-specific SS block (BS may initialize DMRS sequence with SS block index and beam-specific/non-beam-specific indication. DMRS may be gold sequence including two M sequences, and for each M sequence there is a certain initialization formula, and the initialization formula can be defined with a specific input, so the DMRS sequence is changed based on its initialization; and one of the inputs used for initialization may include a cell ID, a SS block index and an indication of beam-specific/non-beam-specific SS block position.

4) A half-frame timing bit is reused to indicate whether the transmitted synchronization signal block is provided via either a beam-specific synchronization signal block position or a non-beam-specific synchronization signal block position. 1 bit half-frame timing info used in licensed spectrum and carried in PBCH payload is used in unlicensed spectrum to indicate the SS block type (beam-specific or non-beam-specific)—this would require that 5 ms SS burst set periodicity is not supported in unlicensed spectrum (considered not needed because of low velocity target environments); PBCH may carry 1 bits info indicating frame timing, indicating whether the PBCH (including SS block) is transmitted during first 5 ms of radio frame, or during last 5 ms of radio frame. One possibility—unlicensed use does not support (nor require) 5 ms SS burst set periodicity, and the 1 bit (that was previously used to indicate frame timing for PBCH) may be re-used here to indicate beam-specific or non-beam-specific SS block position.

In one example implementation, only a portion (and less than all) of a SS block may be transmitted on a non-beam-specific block position, e.g., such as a portion of the SS block, which may not convey or include PBCH, and may include at least one of PSS and SSS signals. In this manner, at least a portion of the SS block, such as PSS and/or SSS signals, are provided to the UE for time-frequency synchronization and/or cell identification. One or more other portions of the SS block may be omitted in this illustrative example, at least in some cases, for a SS block transmitted via a non-beam-specific SS block position.

In one embodiment, it's proposed that above mentioned non-beam-specific (or opportunistic) SS block positions are implicitly configured as "forward compatibility" resource sets (reserved). A BS/gNB may in PDCCH DCI scheduling the corresponding PDSCH indicate whether or not the PDSCH is rate matched or not around the resource sets if PDSCH allocation overlaps with the resource sets. For UEs that have RRC connection or data connection with a BS/eNB, UE may know or determine which positions are non-beam-specific positions, but UE does not know which non-beam-specific SS block positions will be used at a specific time for the transmission of a SS block (hence the control information may convey this information, for example); when BS scheduled PDCCH, and allocation overlaps, or is adjacent to, the possible non-beam-specific SS block position in time and/or frequency resource, the BS in scheduling command transmitted through PDCCH (DCI) may indicate whether PDSCH is rate matched or not around the SS block allocation. When BS schedules the UE, it indicates whether it uses the resources of this non-beam specific SS block position or not. If these non-beam-specific SS block resources are not used for SS block transmission, then these SS block position resources can be used for DL data transmission over PDSCH (e.g., since these SS block position resources may be adjacent to time-frequency resources used for DL data transmission, these DL data transmission resources may be increased by using the unused SS block position resources). BS may indicate in DCI (downlink control information) whether the DL data is transmitted around (or near) the resources (could be adjacent in time or frequency) for a non-beam-specific (alternate or secondary or opportunistic) SS block position. In this case, the BS reserves the possibility that it may transmit the SS block on this non-beam-specific position (or may use this resource for data).

Example UE procedure: UE tries to detect SS block on beam-specific SS block positions and then acquire/track time-frequency synchronization, and perform L1-RSRP measurement (for a specific beam) to determine SS block beam strengths. The UE may try to detect non-beam-specific SS block transmissions especially if it determines that certain SS block transmissions were omitted (e.g., SS blocks associated with previous strongest or one among the previous N strongest beams, were omitted or not received via beam-specific SS block positions). If the UE detects a SS block via a non-beam-specific SS block position, the UE may then use this SS block for cell-specific operations or determinations, e.g., for time-frequency synchronization and/or cell identification, e.g., based on received PSS/SSS signals.

In case non-beam-specific SS block positions are considered as "future compatibility" resources (implicitly configured by UE), the UE needs to determine from PDCCH DCI whether or not corresponding PDSCH is rate matched around the certain non-beam-specific SS block positions (i.e. "future compatibility" resources) if the PDSCH allocation overlaps with or is adjacent to those resources. BS may indicate the resources for non-beam-specific block positions are reserved, and when UE receives DL data, the UE does not assume that there is any data (PDSCH) on these non-beam-specific SS block position resources; BS indicates in DCI whether non-beam-specific SS block positions that are adjacent in time or frequency with transmitted data are reserved for transmission (could be used by BS for transmission of either data or a SS block).

Thus, for example, in one example implementation, the BS may indicate whether the non-beam-specific SS block position resources are reserved for this BS DL transmission; and if BS indicates these non-beam-specific position resources are reserved, then this indicates that data is not transmitted on these SS block position resources, but a SS block might be transmitted on these non-beam-specific position resources.

Example BS/gNB procedure: BS/gNB configures (see above various example control information that may be used to convey this information) non-beam-specific SS block positions for at least one UE and/or for at least one cell;

BS/gNB determines that at least one SS block needs to transmitted using at least one beam;

BS/gNB performs at least one channel sensing (LBT) using at least one beam;

LBT positive (channel is available) in at least one first beam: Transmit SS block(s) using at least one first beam and beam-specific block positions;

LBT negative (channel is occupied) in at least one second beam when trying to transmit on beam-specific SS block position;

Determine that at least one SS block needs to be transmitted using at least one second beam at least one non-beam-specific SS block position;

If LBT is positive (channel not busy) in at least one second beam: then transmit SS block(s) using at least one second beam on at least one non-beam-specific SS block position;

If LBT is negative (channel busy) in at least one second beam: then omit SS block transmission in at least one second beam on at least one non-beam-specific block position.

It should be noted that, for example, BS/gNB may use multiple beam-specific SS block positions for the same beam when the number of beams is half (or less) of the maximum number of SS block positions, and resort to non-beam-specific SS block positions only when negative LBT (channel is busy) is seen on all beam-specific SS block positions of that beam. Within the beam-specific SS block positions, the BS may have multiple tries to transmit SS block on that 1 beam. On non-beam-specific SS block positions, there is no associated or assigned beam, and thus, non-beam-specific SS blocks cannot be used for beam identification, for example. Also, when BS/gNB does not need to transmit SS block on non-beam-specific SS block position, radio resources of that non-beam-specific SS block position may be used by BS for other purposes, e.g. for transmission of data (e.g., via PDCCH & PDSCH).

Some Example Advantages:

UE is able to obtain and maintain time-frequency synchronization and perform time-frequency tracking, and cell identification when operating in unlicensed spectrum, even if SS block is not transmitted on beam-specific SS block position(s) due to LBT (busy channel), through use of non-beam-specific (e.g., secondary or alternate or opportunistic) SS block positions;

The solution scales to any number of beams supported by NR;

The solution has low (SS block) overhead; and/or

The solution has low UE complexity (no impact to beam management etc.).

Figure 4:
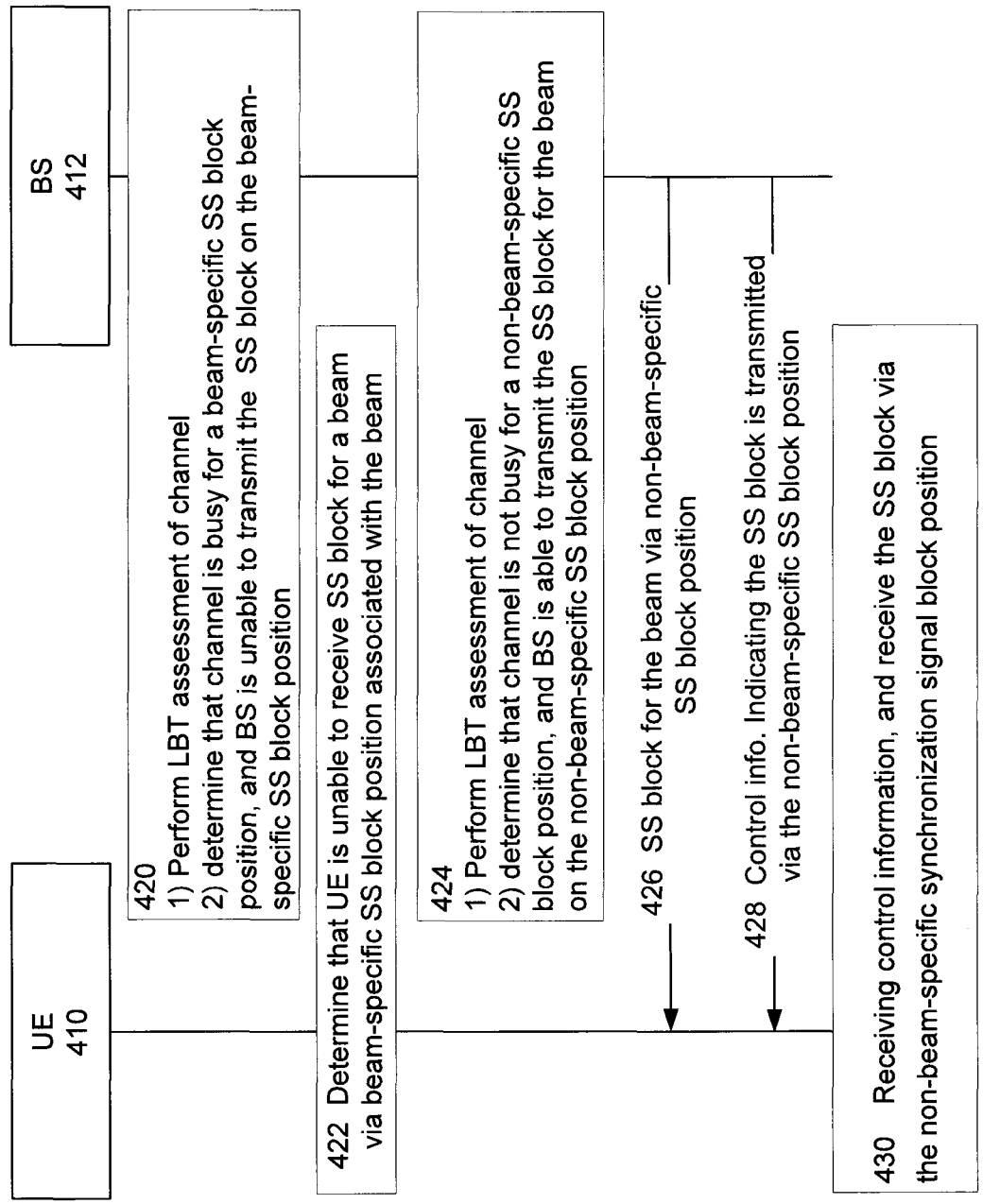
FIG. 4 is a diagram illustrating operation of a system according to an example implementation.

FIG. 4 is a diagram illustrating operation of a system according to an example implementation. A UE 410 may be connected to or in communication with a BS 412.

At 420, the BS may perform a LBT channel assessment, and determine whether or not the channel is busy for time-frequency resources assigned to or associated with a beam-specific SS block position associated with a beam. Although not shown in FIG. 4, if the LBT channel assessment indicates an available channel for the resources of the beam-specific SS block position for the beam, then the BS may transmit the SS block during this beam-specific SS block position for (or associated with) the beam. On the other hand, if the LBT channel assessment indicates that the channel is busy or occupied for the time-frequency resources of beam-specific SS block position, then the BS 412 is unable to transmit an SS block for the beam on the beam-specific SS block position for that beam (because the channel is busy or occupied by another transmitting wireless node). Thus, in such a case where the channel is busy, the BS 412 omits transmitting the SS block on the (unavailable) time-frequency resources of the beam-specific SS block position for the beam.

At 422, the UE may determine that the UE is unable to receive (or does not receive) a SS block for the beam-specific SS block position associated with the beam.

At 424, the BS 412 performs another LBT channel assessment and determines that the channel is not busy (not occupied) for time-frequency resources of a non-beam-specific SS block position, and thus, determines that the BS may transmit a SS block for the beam via the available non-beam-specific SS block position. Also, if at 424, the BS 412 performs LBT channel assessment and determines that the channel is busy or occupied for the time-frequency resources of the non-beam-specific SS block position, then the BS 412 may attempt to transmit the SS block for the failed beam via a next or subsequent non-beam specific SS block position (by BS 412 repeating the LBT channel assessment to determine whether the next or subsequent non-beam-specific SS block position is available to be used by BS 412 to transmit the SS block for the beam that failed at 420).

At 426, the BS 412 then transmits the SS block for the beam (via the beam) via the available non-beam-specific SS block position.

At 428, the UE 410 may receive from the BS (e.g., within the transmitted SS block) control information indicating that the SS block is transmitted via the non-beam-specific SS block position. Also, in some cases, operation 428 may be performed before the transmission of the SS block via non-beam-specific block position. The control information, e.g., indicating that a SS block is or will be transmitted via a non-beam-specific SS block position, may be provided within or as part of the transmitted SS block, or may be transmitted by the BS 412 as or within a separate message or separate control information (e.g., the control information may be sent separately from the SS block).

At 430, the UE 410 receives the control information, and also receives the SS block via the non-beam-specific SS block position.

Figure 5:
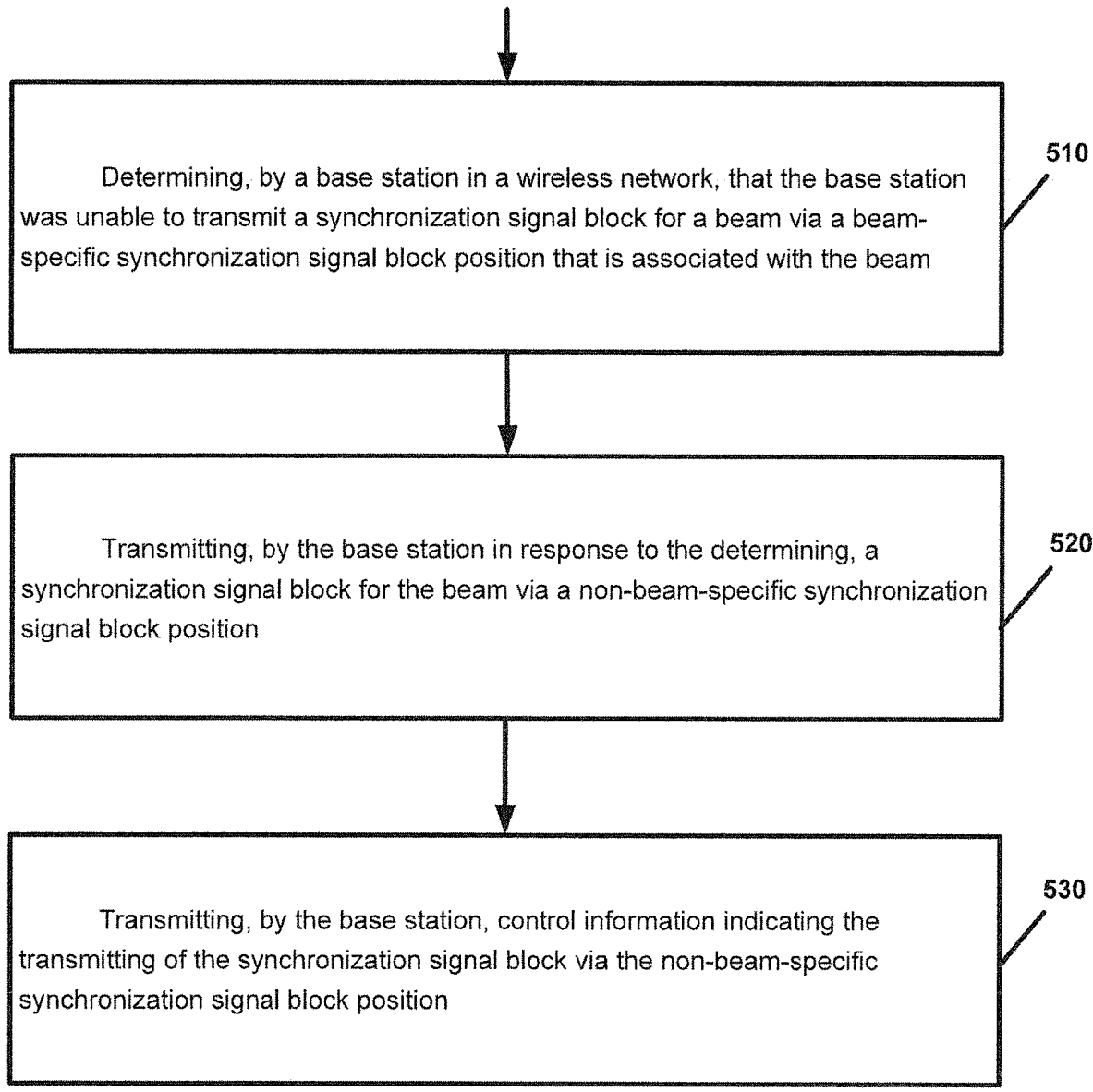
FIG. 5 is a flow chart illustrating operation of a base station according to an example implementation.

Example 1: FIG. 5 is a flow chart illustrating operation of a base station according to an example implementation. Operation 510 includes determining, by a base station in a wireless network, that the base station was unable to transmit a synchronization signal block for a beam via a beam-specific synchronization signal block position that is associated with the beam. Operation 520 includes transmitting, by the base station in response to the determining, a synchronization signal block for the beam via a non-beam-specific synchronization signal block position. And, operation 530 includes transmitting, by the base station, control information indicating the transmitting of the synchronization signal block via the non-beam-specific synchronization signal block position.

Example 2: According to an example implementation of the method of example 1, wherein the transmitting control information comprises: transmitting, by the base station, control information, within or as part of the transmitted synchronization signal block, indicating the transmitting of the synchronization signal block via the non-beam-specific synchronization signal block position.

Example 3: According to an example implementation of the method of any of examples 1-2, wherein the transmitting control information comprises: transmitting, by the base station, control information, separately from the transmitted synchronization signal block, indicating the transmitting of the synchronization signal block via the non-beam-specific synchronization signal block position.

Example 4: According to an example implementation of the method of any of examples 1-3, wherein the transmitting a synchronization signal block comprises: transmitting, by the base station in response to the determining, a synchronization signal block for the beam via a non-beam-specific synchronization signal block position out of a plurality of non-beam-specific synchronization signal block positions that are not associated with or assigned to any beam.

Example 5: According to an example implementation of the method of any of examples 1-4, wherein the determining that the base station was unable to transmit a synchronization signal block for a beam via the beam-specific synchronization signal block position comprises: performing a listen-before-talk (LBT) assessment of a wireless channel; and determining, based on the LBT assessment, that the wireless channel is busy or occupied for the beam-specific synchronization signal block position, wherein the beam-specific synchronization signal block position comprises a set of time-frequency resources.

Example 6: According to an example implementation of the method of any of examples 1-5, wherein the transmitting, by the base station in response to the determining, a synchronization signal block for the beam via a non-beam-specific synchronization signal block position comprises: performing a listen-before-talk (LBT) assessment of a wireless channel; determining, based on the LBT assessment, that the wireless channel is not busy or occupied for the non-beam-specific synchronization signal block position; and transmitting, by the base station, a synchronization signal block for the beam via the non-beam-specific synchronization signal block position.

Example 7: According to an example implementation of the method of any of examples 1-6, wherein: the beam-specific synchronization signal block position is associated with or assigned to the beam; and the non-beam-specific synchronization signal block position is not associated with or assigned to any beam.

Example 8: According to an example implementation of the method of any of examples 1-7, wherein the beam-specific synchronization signal block position is permanently or semi-statically associated with or assigned to the beam, Example 9: According to an example implementation of the method of any of examples 1-8, wherein the synchronization signal block transmitted via the non-beam-specific synchronization signal block position is provided for at least one of: initial system acquisition including time-frequency synchronization; tracking of time-frequency synchronization; and cell identification.

Example 10: According to an example implementation of the method of any of examples 1-9, wherein the synchronization signal block transmitted via the non-beam-specific synchronization signal block position is not provided for at least one of: determining a random access resource for the beam; and beam measurement.

Example 11: According to an example implementation of the method of any of examples 1-10, wherein the synchronization signal block comprises at least one of primary synchronization signals (PSS), secondary synchronization signals (SSS), a physical broadcast control channel (PBCH), and demodulation reference signals (DMRS).

Example 12: According to an example implementation of the method of any of examples 1-11, wherein control information indicating the transmitting of the synchronization signal block via the non-beam-specific synchronization signal block position comprises at least one of the following: one or more bits indicating whether each of a plurality of synchronization signal block positions are a beam-specific synchronization signal block position or an non-beam-specific synchronization signal block position; demodulation reference signal elements, which are part of a transmitted synchronization signal block, are multiplied by a code indicating whether the transmitted synchronization signal block is provided via either a beam-specific synchronization signal block position or a non-beam-specific synchronization signal block position; and a half-frame timing bit is reused to indicate whether the transmitted synchronization signal block is provided via either a beam-specific synchronization signal block position or a non-beam-specific synchronization signal block position.

Example 13: According to an example implementation of the method of example 12, wherein the code comprises either a first code [1 1] or a second code [1 −1].

Example 14: An apparatus comprising at least one processor and at least one memory including computer instructions that, when executed by the at least one processor, cause the apparatus to: determine, by a base station in a wireless network, that the base station was unable to transmit a synchronization signal block for a beam via a beam-specific synchronization signal block position that is associated with the beam; transmit, by the base station in response to the determining, a synchronization signal block for the beam via a non-beam-specific synchronization signal block position;

and transmit, by the base station, control information indicating the transmitting of the synchronization signal block via the non-beam-specific synchronization signal block position.

Figure 6:
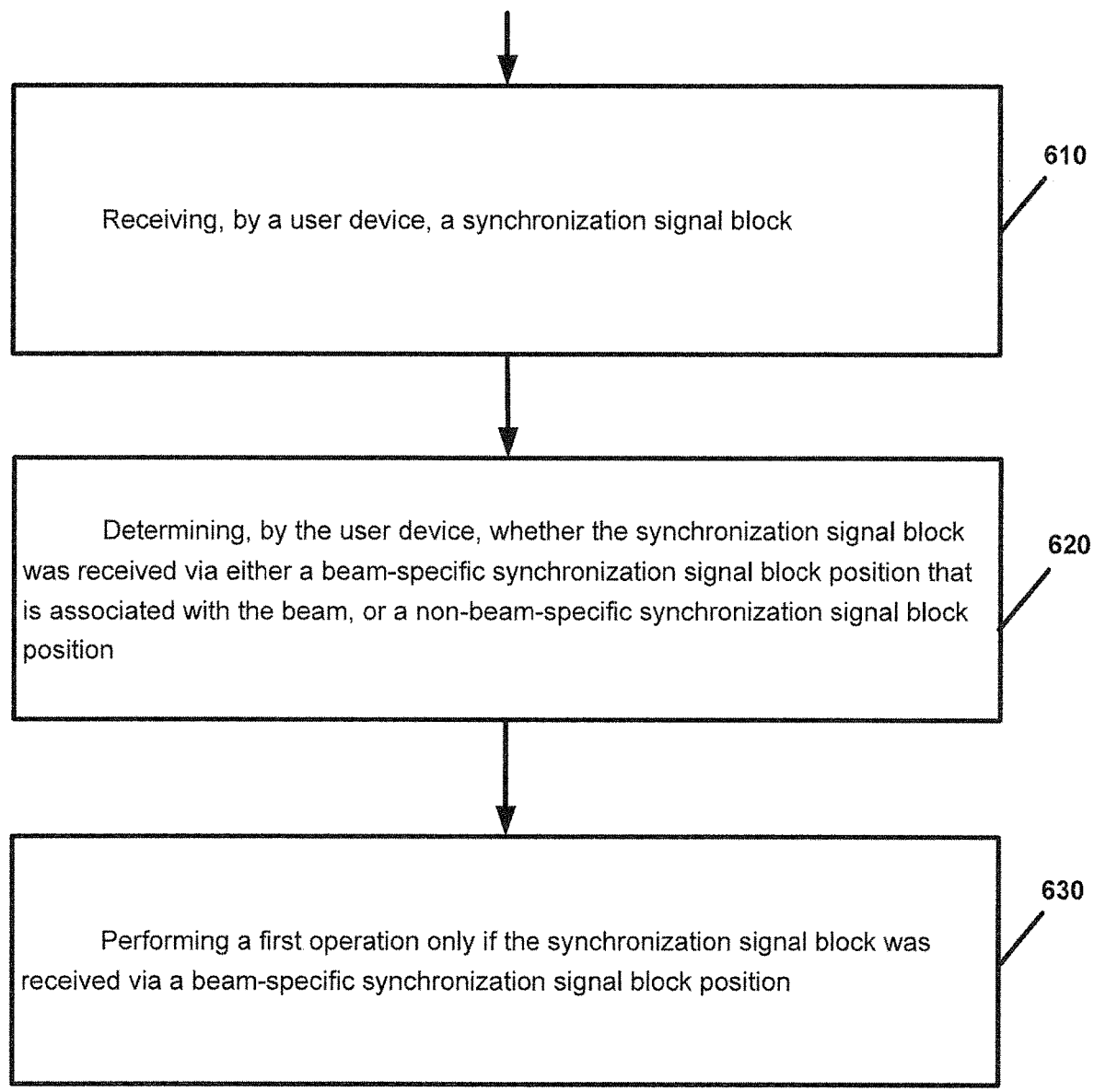
FIG. 6 is a flow chart illustrating operation of a user device (UE) according to an example implementation.

Example 15: FIG. 6 is a flow chart illustrating operation of a user device according to an example implementation. Operation 610 includes receiving, by a user device, a synchronization signal block. Operation 620 includes determining, by the user device, whether the synchronization signal block was received via either a beam-specific synchronization signal block position that is associated with the beam, or a non-beam-specific synchronization signal block position. And, operation 630 includes performing a first operation only if the synchronization signal block was received via a beam-specific synchronization signal block position.

Example 16: According to an example implementation of the method of example 15, wherein the performing comprises: performing at least one of: random access resource determination for the beam based on the synchronization signal block, and beam measurement for the beam based on the synchronization signal block, if the synchronization signal block was received via a beam-specific synchronization signal block position that is associated with the beam.

Example 17: According to an example implementation of the method of any of examples 15-16, and further comprising: performing at least one of the following regardless whether the synchronization signal block was received via either a beam-specific synchronization signal block position that is associated with the beam, or a non-beam-specific synchronization signal block position: time-frequency synchronization; and cell identification.

Example 18: According to an example implementation of the method of any of examples 15-17 wherein the determining whether the synchronization signal block was received via either a beam-specific synchronization signal block position that is associated with the beam, or a non-beam-specific synchronization signal block position comprises at least one of the following: receiving, by the user device, control information, within or as part of the synchronization signal block, indicating the transmitting of the synchronization signal block via the non-beam-specific synchronization signal block position; and receiving, by the user device, control information, separately from the synchronization signal block, indicating the transmitting of the synchronization signal block via the non-beam-specific synchronization signal block position.

Example 19: An apparatus comprising at least one processor and at least one memory including computer instructions that, when executed by the at least one processor, cause the apparatus to: receive, by a user device, a synchronization signal block; determine, by the user device, whether the synchronization signal block was received via either a beam-specific synchronization signal block position that is associated with the beam, or a non-beam-specific synchronization signal block position; and perform a first operation only if the synchronization signal block was received via a beam-specific synchronization signal block position.

Figure 7:
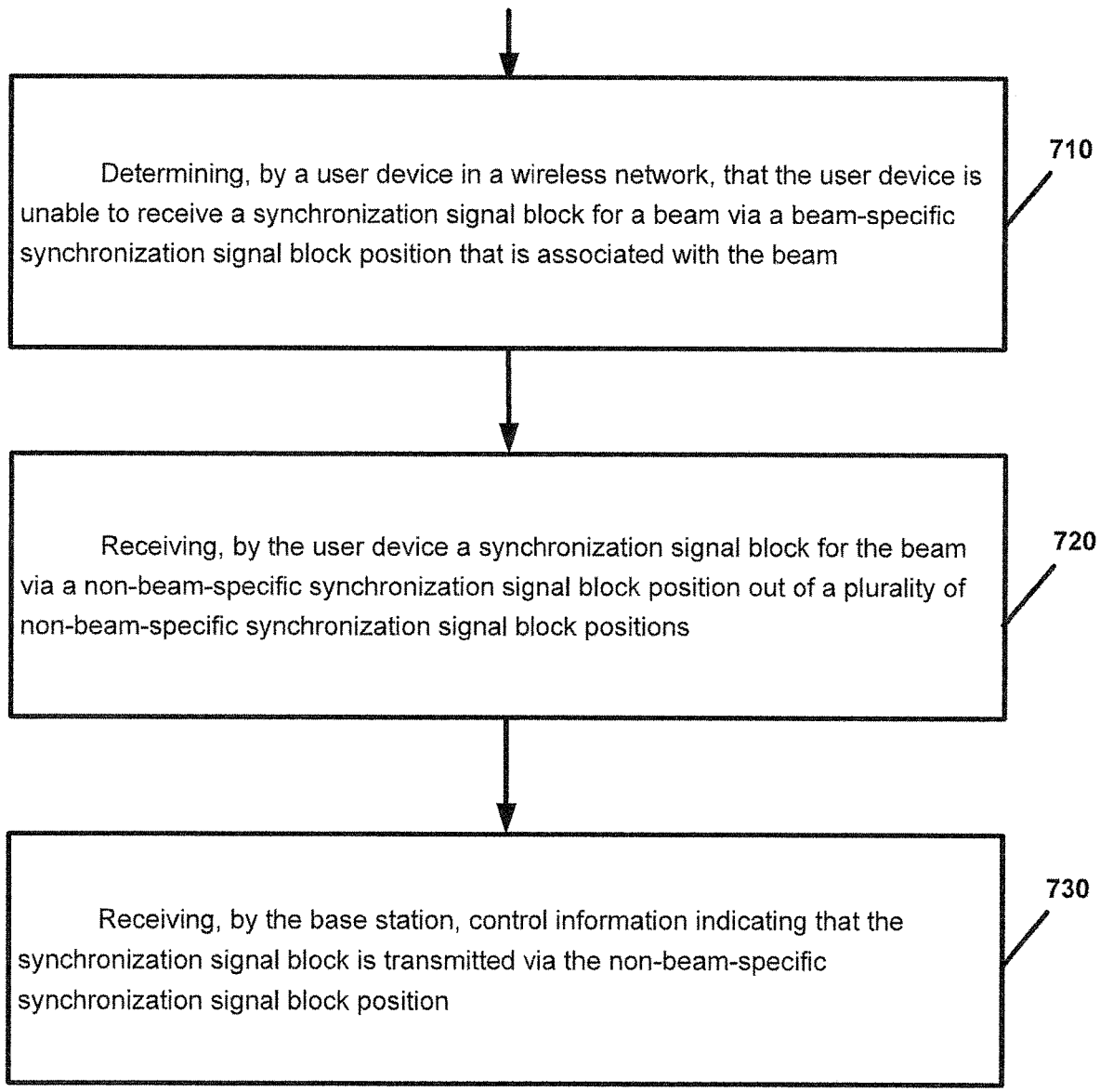
FIG. 7 is a flow chart illustrating operation of a user device (UE) according to another example implementation.

Example 20: FIG. 7 is a flow chart illustrating operation of a user device according to an example implementation. Operation 710 includes determining, by a user device in a wireless network, that the user device is unable to receive a synchronization signal block for a beam via a beam-specific synchronization signal block position that is associated with the beam. Operation 720 includes receiving, by the user device a synchronization signal block for the beam via a non-beam-specific synchronization signal block position out of a plurality of non-beam-specific synchronization signal block positions. And, operation 730 includes receiving, by the user device, control information indicating that the synchronization signal block is transmitted via the non-beam-specific synchronization signal block position.

Example 21: According to an example implementation of the method of example 20, wherein the control information is received via either within or as part of the synchronization signal block, or as control information that is sent separately from the synchronization signal block.

Example 22: An apparatus comprising at least one processor and at least one memory including computer instructions that, when executed by the at least one processor, cause the apparatus to: determine, by a user device in a wireless network, that the user device is unable to receive a synchronization signal block for a beam via a beam-specific synchronization signal block position that is associated with the beam; receive, by the user device a synchronization signal block for the beam via a non-beam-specific synchronization signal block position out of a plurality of non-beam-specific synchronization signal block positions; and receive, by the user device, control information indicating that the synchronization signal block is transmitted via the non-beam-specific synchronization signal block position.

Example 23: An apparatus comprising means for performing a method of any of examples 1-13, 15-18, 20 and 21.

Example 24: An apparatus comprising at least one processor and at least one memory including computer instructions that, when executed by the at least one processor, cause the apparatus to perform a method of any of examples 1-13, 15-18, 20 and 21.

Example 25: An apparatus comprising a computer program product including a non-transitory computer-readable storage medium and storing executable code that, when executed by at least one data processing apparatus, is configured to cause the at least one data processing apparatus to perform a method of any of examples 1-13, 15-18, 20 and 21.

Figure 8:
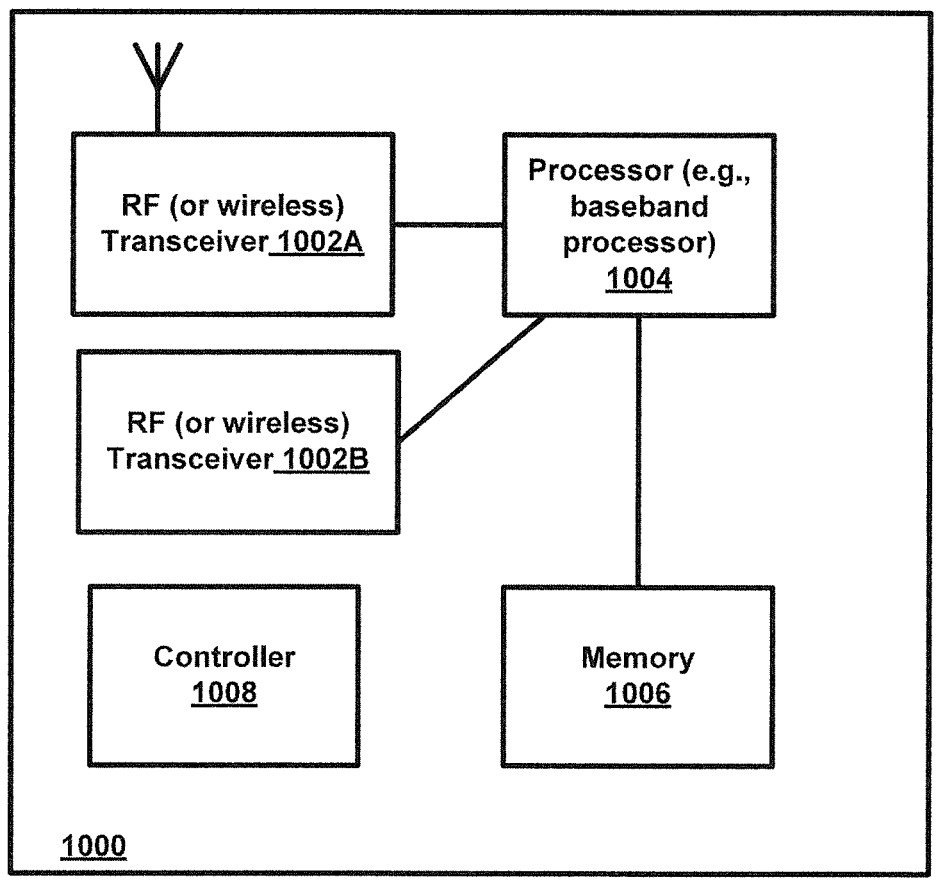
FIG. 8 is a block diagram of a node or wireless station (e.g., base station/access point or mobile station/user device) according to an example implementation.

FIG. 8 is a block diagram of a wireless station (e.g., AP, BS, relay node, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:
   at least one processor; and
   at least one memory including computer instructions that, when executed by the at least one processor, cause the apparatus at least to perform:
   determining that the apparatus was unable to transmit a synchronization signal block for a beam via a beam-specific synchronization signal block position that is associated with the beam;
   transmitting, in response to the determining, a synchronization signal block for the beam via a non-beam-specific synchronization signal block position out of a plurality of non-beam-specific synchronization signal block positions that are not associated with or assigned to any beam; and
   transmitting control information indicating the transmitting of the synchronization signal block via the non-beam-specific synchronization signal block position.

2. The apparatus of claim 1, wherein the transmitting control information comprises:
   transmitting control information, within or as part of the transmitted synchronization signal block, indicating the transmitting of the synchronization signal block via the non-beam-specific synchronization signal block position.

3. The apparatus of claim 1, wherein the transmitting control information comprises:
   transmitting control information, separately from the transmitted synchronization signal block, indicating the transmitting of the synchronization signal block via the non-beam-specific synchronization signal block position.

4. The apparatus of claim 1, wherein the determining that the apparatus was unable to transmit a synchronization signal block for a beam via the beam-specific synchronization signal block position comprises:
   performing a listen-before-talk (LBT) assessment of a wireless channel; and
   determining, based on the LBT assessment, that the wireless channel is busy or occupied for the beam-specific synchronization signal block position, wherein the beam-specific synchronization signal block position comprises a set of time-frequency resources.

5. The apparatus of claim 1, wherein the transmitting in response to the determining, a synchronization signal block for the beam via a non-beam-specific synchronization signal block position comprises:
   performing a listen-before-talk (LBT) assessment of a wireless channel; and
   determining, based on the LBT assessment, that the wireless channel is not busy or occupied for the non-beam-specific synchronization signal block position; and
   transmitting a synchronization signal block for the beam via the non-beam-specific synchronization signal block position.

6. The apparatus of claim 1, wherein:
   the beam-specific synchronization signal block position is associated with or assigned to the beam; and
   the non-beam-specific synchronization signal block position is not associated with or assigned to any beam.

7. The apparatus of claim 1, wherein the beam-specific synchronization signal block position is permanently or semi-statically associated with or assigned to the beam.

8. The apparatus of claim 1, wherein the synchronization signal block transmitted via the non-beam-specific synchronization signal block position is provided for at least one of:
   initial system acquisition including time-frequency synchronization;
   tracking of time-frequency synchronization; or
   cell identification.

9. The apparatus of claim 1, wherein the synchronization signal block transmitted via the non-beam-specific synchronization signal block position is not provided for at least one of:
   determining a random access resource for the beam; or
   beam measurement.

10. The apparatus of claim 1, wherein the synchronization signal block comprises at least one of primary synchronization signals, secondary synchronization signals, a physical broadcast control channel, or demodulation reference signals.

11. The apparatus of claim 1, wherein the control information indicating the transmitting of the synchronization signal block via the non-beam-specific synchronization signal block position comprises at least one of the following:
   one or more bits indicating whether each of a plurality of synchronization signal block positions are a beam-specific synchronization signal block position or an non-beam-specific synchronization signal block position;
   demodulation reference signal elements, which are part of a transmitted synchronization signal block, are multiplied by a code indicating whether the transmitted synchronization signal block is provided via either a beam-specific synchronization signal block position or a non-beam-specific synchronization signal block position; or a half-frame timing bit is reused to indicate whether the transmitted synchronization signal block is provided via either a beam-specific synchronization signal block position or a non-beam-specific synchronization signal block position.

12. The apparatus of claim 11, wherein the code comprises either a first code [1 1] or a second code [1 −1].

13. An apparatus, comprising:
at least one processor; and
at least one memory including computer instructions that, when executed by the at least one processor, cause the apparatus at least to perform:
receiving a synchronization signal block;
determining whether the synchronization signal block was received via either a beam-specific synchronization signal block position that is associated with the beam, or a non-beam-specific synchronization signal block position; and
performing, in response to the determining, a first operation if the synchronization signal block was received via a beam-specific synchronization signal block position and not performing, in response to the determining, the first operation if the synchronization signal block was received via a non-beam-specific synchronization signal block position.

14. The apparatus of claim 13 wherein, if the synchronization signal block was received via a beam-specific synchronization signal block position that is associated with a beam, the first operation comprises at least one of:
random access resource determination for the beam based on the synchronization signal block, or
beam measurement for the beam based on the synchronization signal block.

15. The apparatus of claim 13, wherein the at least one processor and at least one memory including computer instructions that, when executed by the at least one processor, further cause the apparatus at least to:
perform at least one of the following regardless whether the synchronization signal block was received via either a beam-specific synchronization signal block position that is associated with the beam, or a non-beam-specific synchronization signal block position:
time-frequency synchronization; or
cell identification.

16. The apparatus of claim 13, wherein the determining whether the synchronization signal block was received via either a beam-specific synchronization signal block position that is associated with the beam, or a non-beam-specific synchronization signal block position comprises at least one of the following:
receiving control information, within or as part of the synchronization signal block, indicating the transmitting of the synchronization signal block via the non-beam-specific synchronization signal block position; or
receiving control information, separately from the synchronization signal block, indicating the transmitting of the synchronization signal block via the non-beam-specific synchronization signal block position.

17. A method, comprising:
receiving a synchronization signal block;
determining whether the synchronization signal block was received via either a beam-specific synchronization signal block position that is associated with the beam, or a non-beam-specific synchronization signal block position; and
performing, in response to the determining, a first operation if the synchronization signal block was received via a beam-specific synchronization signal block position and not performing, in response to the determining, the first operation if the synchronization signal block was received via a non-beam-specific synchronization signal block position.

18. The method of claim 17, wherein, if the synchronization signal block was received via the beam-specific synchronization signal block position that is associated with the beam, the first operation comprises at least one of:
random access resource determination for the beam based on the synchronization signal block, or
beam measurement for the beam based on the synchronization signal block.

19. The method of claim 17, wherein the determining whether the synchronization signal block was received via either a beam-specific synchronization signal block position that is associated with the beam, or a non-beam-specific synchronization signal block position comprises at least one of the following:
receiving control information, within or as part of the synchronization signal block, indicating the transmitting of the synchronization signal block via the non-beam-specific synchronization signal block position; or
receiving control information, separately from the synchronization signal block, indicating the transmitting of the synchronization signal block via the non-beam-specific synchronization signal block position.

20. The method of claim 17, further comprising:
performing at least one of the following regardless whether the synchronization signal block was received via either a beam-specific synchronization signal block position that is associated with the beam, or a non-beam-specific synchronization signal block position:
time-frequency synchronization; or
cell identification.

21. A method, comprising:
determining that a base station was unable to transmit a synchronization signal block for a beam via a beam-specific synchronization signal block position that is associated with the beam;
transmitting, in response to the determining, a synchronization signal block for the beam via a non-beam-specific synchronization signal block position out of a plurality of non-beam-specific synchronization signal block positions that are not associated with or assigned to any beam; and
transmitting control information indicating the transmitting of the synchronization signal block via the non-beam-specific synchronization signal block position.

* * * * *